US008497875B2

(12) United States Patent
Lee (10) Patent No.: US 8,497,875 B2
(45) Date of Patent: Jul. 30, 2013

(54) SYSTEM, METHOD, AND COMPUTER PROGRAM PRODUCT FOR DETERMINING A TRANSLATION VECTOR

(75) Inventor: Chen-Han Lee, Diamond Bar, CA (US)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 1007 days.

(21) Appl. No.: 12/549,078

(22) Filed: Aug. 27, 2009

(65) Prior Publication Data

US 2010/0182344 A1   Jul. 22, 2010

Related U.S. Application Data

(60) Provisional application No. 61/146,092, filed on Jan. 21, 2009.

(51) Int. Cl.
*G09G 5/00* (2006.01)

(52) U.S. Cl.
USPC ............ 345/620; 345/423; 345/424; 345/419

(58) Field of Classification Search
USPC ........... 345/419, 423, 424, 619, 620; 382/152
See application file for complete search history.

(56) References Cited

U.S. PATENT DOCUMENTS

| | | | | |
|---|---|---|---|---|
| 5,243,665 A | * | 9/1993 | Maney et al. | 382/152 |
| 5,548,694 A | * | 8/1996 | Frisken Gibson | 345/424 |
| 6,452,604 B1 | * | 9/2002 | Sato | 345/619 |

OTHER PUBLICATIONS

S. Cameron, "Enhancing GJK: Computing Minimum and Penetration Distances Between Convex Polyhedra" IEEE Int. Conf. Robotics & Automation, Albuquerque, Apr. 22-24, 1997, pp. 1-6.
E.G. Gilbert, et al., "A Fast Procedure for Computing the Distance Between Complex Objects in Three-Dimensional Space", IEEE J. Robotics & Automation, vol. 4 1988, pp. 193-203.
Kim, et al. Published in ACM Siggraph Symposium on Computer Animation, Jul. 21, 2002 (pp. 23-31); Magazine.
Ehmann, et al. Published in Computer Graphics Forum Blackwell Publishers for Eurographics Assoc. UK, vol. 20, No. 3, 2001 (pp. 1-18); Magazine.
Khor, et al. Published in IEEE Tencon 2003. Conference on Convergent Technologies for the Asia-Pacific Region. IEEE Region 10 Annual Conference, vol. 2, Oct. 15, 2003 (pp. 853-857); Magazine.
Zhang, et al. Published in Computer Aided Design, Elsevier Publishers, Science Direct. vol. 39, No. 8, Jul. 4, 2007 (pp. 625-638); Magazine.

\* cited by examiner

*Primary Examiner* — Chante Harrison (57) ABSTRACT

A method for determining a minimal translation vector (MTV) between a first object and a second object represented in a CAD system, and a CAD system and computer readable medium for performing a similar method. The method includes retrieving the first object and the second object and tessellating the first object and second object into respective facets. The method includes creating a bounding volume tree of facets corresponding to each of the first object and the second object. The method includes performing a greedy process on the bounding volume to produce an initial MTV, and performing a successive clipping process according to the bounding volume trees and the initial MTV, to produce a final MTV. The method includes storing the final MTV in a computer readable medium. The greedy process can be a 2-step process as described.

21 Claims, 11 Drawing Sheets

SYSTEM, METHOD, AND COMPUTER PROGRAM PRODUCT FOR DETERMINING A TRANSLATION VECTOR

CROSS-REFERENCE TO OTHER APPLICATION

This application claims priority from U.S. Provisional Patent Application 61/146,092, filed Jan. 21, 2009, which is hereby incorporated by reference.

TECHNICAL FIELD

The present disclosure is directed, in general, to computer aided design, drafting, manufacturing, and visualization systems (individually and collectively, "CAD systems").

BACKGROUND OF THE DISCLOSURE

As the term is used in CAD systems, the minimum translation vector (MTV) is the smallest displacement vector required to move one object in relation to another object in order to clear a collision between them. The length of MTV is called Minimum Translation Distance (MTD), also known as penetration distance or collision depth.

SUMMARY OF THE DISCLOSURE

Various embodiments includes a method for determining a minimal translation vector (MTV) between a first object and a second object represented in a CAD system, and a CAD system and a computer program product encoded on a computer readable medium for performing a similar method. The method includes retrieving the first object and the second object and tessellating the first object and second object into respective facets. The method includes creating a bounding volume tree of facets corresponding to each of the first object and the second object. The method includes performing a greedy process on the bounding volume trees to produce an initial MTV, and performing a successive clipping process according to the bounding volume trees and the initial MTV, to produce a final MTV. The method includes storing the final MTV in a computer readable medium.

In some embodiments, the greedy process is performed a first time to determine an estimated MTV, and is performed a second time to determine an improved MTV that is output as the initial MTV. In some embodiments, the greedy process includes the steps of loading initial data, initializing a tree level and a clipping window, performing a voxel process using the tree level and the clipping window to determine a revised MTV, and storing the revised MTV and outputting the revised MTV. In some embodiments, the greedy process is repeated with an increasing tree level until it reaches a predetermined maximum value, In some embodiments, the initial data includes one or more of a tree level value, a use box value, a clipping value, the bounding volume trees, and a current MTV. In some embodiments, the voxel process includes loading voxel initial data, building a voxel model of the clipping window, computing the Minkowski Difference between the bounding volume trees, marking each voxel in the voxel model, determining at least one candidate voxel from the marked voxels, determining a candidate voxel with a smallest vector from an origin, and outputting the smallest vector from the origin as the revised MTV.

In some embodiments, the voxel initial data includes one or more of the clipping window, the bounding volume trees, and the current MTV. In some embodiments, the successive clipping process includes loading clipping process initial data, constructing a clipping window that contains a current MTV and closer to an origin than a previous clipping window, performing a voxel process using the tree level and the clipping window to determine a revised MTV, and storing the revised MTV and outputting the revised MTV as a final MTV.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which:

FIG. 4a illustrate colliding objects and 4b-4c illustrate the difference between optimal and safe MTVs in accordance with disclosed embodiments;

DETAILED DESCRIPTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

The various embodiments described herein include a system and method for determining the Minimum Translation Vector or a minimal translation vector (individually and collectively "MTV") of a pair of shapes or geometrical models in a CAD system that collide (or penetrate) each other. As understood to those of skill in the art, the MTV includes both a distance and direction, while the minimum translation distance (MTD) describes only the length or distance of the MTV. The MTV is the smallest displacement vector required to move one geometrical object to touch (but not collide or penetrate) another geometrical object, while the MTD is the smallest distance required to move one geometrical object to touch (but not collide or penetrate) another geometrical object. When the two objects are apart, MTD is the minimal distance; otherwise it's the penetration distance.

The distance required to clear the collision depends on the direction of the movement. There is one direction that provides the smallest distance and corresponds to MTV. There is no easy way to determine this "optimal" direction other than exhaustive search.

Mathematically speaking, the computation of MTV has very large complexity. For example, if the pair of objects are represented by facet (mesh) model, the computational complexity is proportional to the square of the number of facets in the first object times the number of the facets in the second object, or $(N_1 * N_2)^2$. There are known algorithms to speed up the computation. The fastest can reduce the complexity to $(N_1 * logN_1) * (N_2 * logN_2)$. However, this is still too slow for commercial applications since a typical model in commercial applications could contain hundreds of millions of facets.

The disclosed embodiments includes a practical and fast process to compute MTV, resulting in a reduced complexity of approximately $logN_1 * logN_2$, suitable for commercial applications. In other embodiments, instead of finding the "optimal" direction, the disclosed methods can alternately and optionally find a "safe" direction for MTV In this regard, the MTV may be the minimal "safe" MTV, not the absolute minimum MTV.

Figure 1:
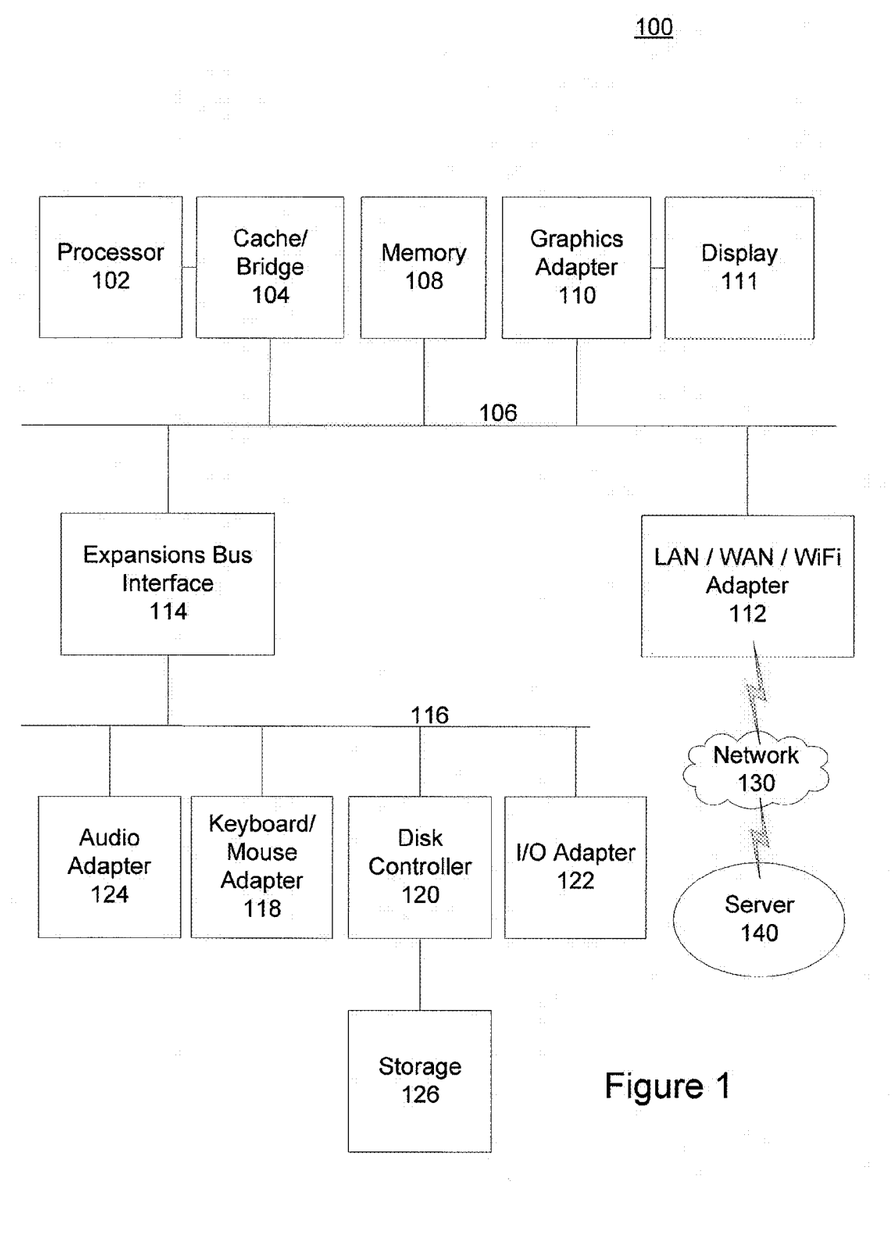
FIG. 1 depicts a block diagram of a data processing system implementing a disclosed embodiment.

FIG. 1 depicts a block diagram of a data processing system in which an embodiment can be implemented, for example as a CAD system particularly configured to perform processes as described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary in particular embodiments. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

MTV is important to collision avoidance and important to a wide range of applications related to the areas of digital manufacturing and CAD systems. Collision detection and avoidance is important for the programming and simulation of the movement of various components, such as robots, machine tools, and other manufacturing equipments. When a programmed movement causes collision, the preferred resolution includes the computation of MTV to determine how to modify the program to avoid the collision.

Collision detection itself is a common feature of CAD systems and is well known to those of skill in the art. However, this common capability only detects the existence of collision but doesn't provide additional analysis of the collision depth.

One reason of the lack of commercial MTV capability is the performance barrier. As stated earlier, the computational complexity makes it very slow to perform the computation and forbids practical implementation.

The computation of the MTV between two convex objects is a well studied subject. Known methods, such as those described in the Gilbert and Cameron papers cited below, are based on the observation that the MTV between two objects is the shortest vector from origin to the Minkowski Difference of the two objects. Hence, the problem of MTV is equivalent to computing Minkowski Difference.

The computation of the Minkowski Difference between two strictly convex objects is well known. The definition of Minkowski Difference between two objects (bodies) A and B is: $\langle B-A \rangle \equiv \{b-a : b \in B, a \in A\}$. That is, a Minkowski Difference is the superposition of two objects.

Figure 2A:
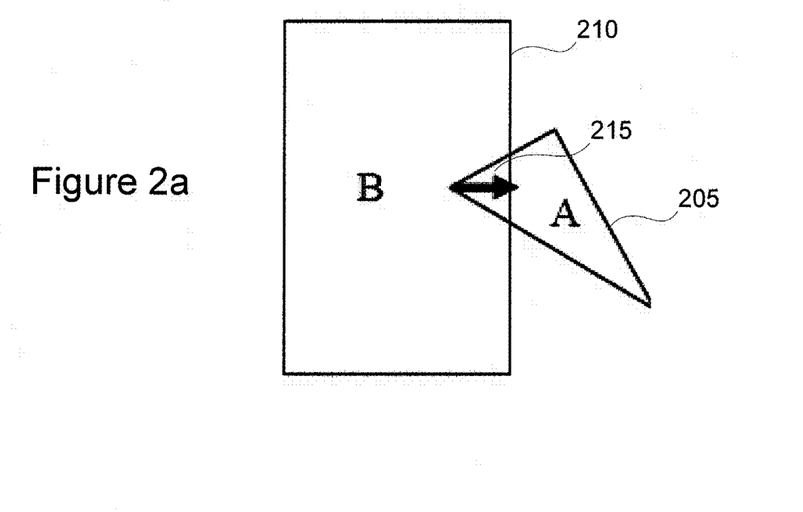
FIGS. 2a and 2b illustrate colliding objects and the corresponding Minkowski Difference, in accordance with disclosed embodiments.
Figure 2B:
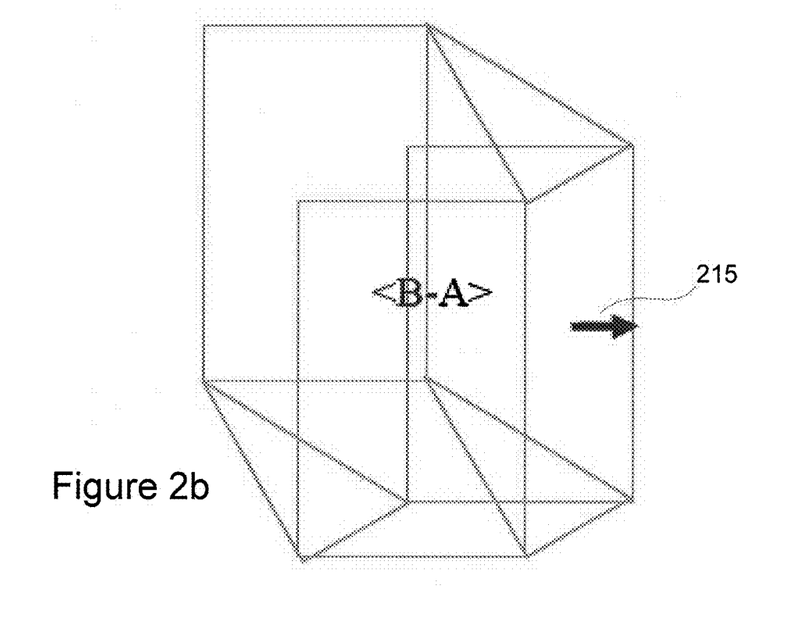

FIG. 2a illustrates objects A 205 and B 210 in collision with each other. FIG. 2b illustrates the Minkowski Difference of objects A and B. The corresponding MTV 215 is shown as the bold arrow.

In application, most shapes are non-convex. Unfortunately, the computation of the Minkowski Difference between two non-convex objects is very complex and difficult. To generalize the above method to non-convex shapes, for example as in the Ehmann and Kim papers cited below, the system can first decompose each non-convex shape into a union of smaller convex pieces. It can be proved that the total Minkowski Difference is the union of the Minkowski Differences of individual convex pieces:

$$A = \bigcup_i A_i$$

$$B = \bigcup_j B_j$$

$$\langle B - A \rangle = \bigcup_{i,j} C_{j,i}$$

$$C_{j,i} = \langle B_j - A_i \rangle$$

If there are $N_1$ convex pieces in object 1 and $N_2$ convex pieces in object 2, the total number of pair wise Minkowski Differences is $N_1 * N_2$. To compute the union of them, the system can analyze each Minkowski Difference against every other, so the total complexity is the square: $(N_1 * N_2)^2$.

Figure 3A:
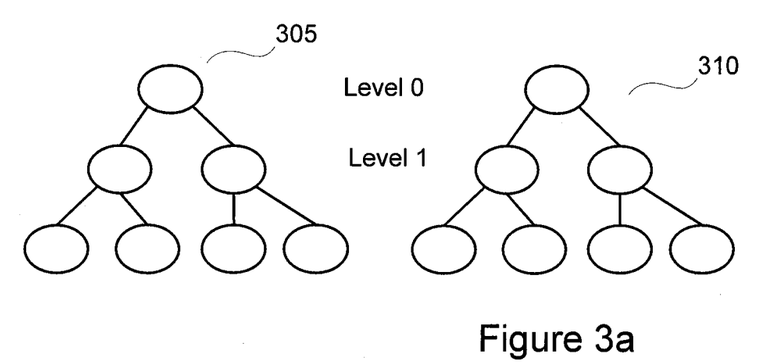
FIG. 3a depicts two bounding volume trees and FIG. 3b depicts bounding boxes of the corresponding tree nodes, in accordance with disclosed embodiments.

Specific techniques can help to speed up the computation, including:

Bounding Volume Hierarchy: Organize the convex pieces of an object into a spatial tree such that all pieces close to each other are placed in the same branch. An example of such is KD-tree. For each branch node, a bounding box of all descendents is computed and stored. FIG. 3a shows an example of the structure of the two bounding volume trees 305 and 310, one for each object, corresponding in this example to objects 205 and 210 of FIG. 2. At the root level (level 0), only the root objects are shown as a single node per object. At the next level (level 1), two descendant nodes are shown for each object.

Figure 3B:
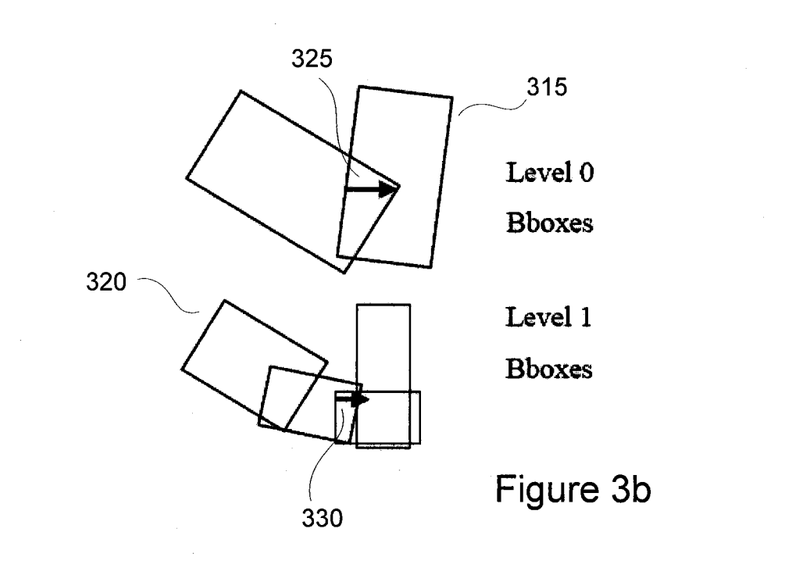

FIG. 3b illustrates an example of the corresponding bounding boxes of the root level 315 (level 0) and the next level 320 (level 1) corresponding to the volume tress 305 and 310, respectively, and to objects 205 and 210 of FIG. 2, respectively. Here, again, at level 0 only two bounding boxes are shown, each corresponding to a single object. At level 1, there are two bounding boxes for each object, consistent with the volume tress in FIG. 3a.

Hierarchical Culling: In FIGS. 3a and 3b, one can see that when the system moves from a higher level (level 0) to the next level (level 1), the bounding boxes get smaller and hence the penetration depth becomes smaller. That is, the MTV (shown as the bold arrows) becomes smaller and smaller as the system moves down the tree levels. Note that MTV 330 at level 1 is smaller than MTV 325 of level 0. The disclosed embodiments can use this culling technique to significantly improve the performance.

The system can start at the top level and compute the (estimated) MTV. The system can then move down one level and skip all node pairs that are not as deeply penetrating as (i.e., that are larger than) the estimated MTV from the previous level. After traversing this level, the system can update the estimated MTV (which should be smaller than before) and move down to next level. The same process is repeated until the leaf level is reached and the MTV of the leaf level is the final answer. As a result, a large portion of the tree nodes are never visited so the computation time is significantly reduced.

Using the disclosed culling technique, the expected complexity is reduced from $(N_1 * N_2)^2$ to $(N_1 * \log N_1) * (N_2 * \log N_2)$.

There are other techniques to improve the performance but will only make marginal improvement over $(N_1 * \log N_1) * (N_2 * \log N_2)$. The disclosed embodiments can further reduce the expected complexity from $(N_1 * \log N_1) * (N_2 * \log N_2)$ to $(\log N_1) * (\log N_2)$. The focus is on designing a more aggressive culling strategy. This strategy contains several steps that are described below. This provides a significant technical advantage in allowing a given CAD system processor to more quickly and efficiently find an MTV, or to allow the use of a less powerful processor in a CAD system with suitable speed and efficiency.

Various embodiments use a bounding volume hierarchy scheme. It can be any kind of scheme as long as it contains a spatial hierarchy (like a tree) of convex pieces (components) and each node stores a bounding box that contains all descendent elements. These two signatures of the bounding volume hierarchy scheme are used in some embodiments to implement the aggressive culling strategy disclosed herein.

The disclosed processes are independent of the methods used to compute the Minkowski Differences and the union of them. Any method of them will work with this invention. It works with any kind of bounding boxes, such as the popular choices of Axis-Aligned Bounding Box and Oriented Bounding Box. They are also independent of how the objects are represented and how the convex pieces (components) of the objects are computed, as long as the convex pieces are available.

In various embodiments, the system finds a safe instead of the optimal MTV. Efficiency can be increased substantially by abandoning the goal of finding the optimal (shortest) MTV and instead try to find a "safe" one. In this sense, of course, the safe MTV is not necessarily the "minimum" translation vector, but is a near-minimum translation vector that is substantially less likely to otherwise result in a collision or a problematic tool placement.

Figure 4A:
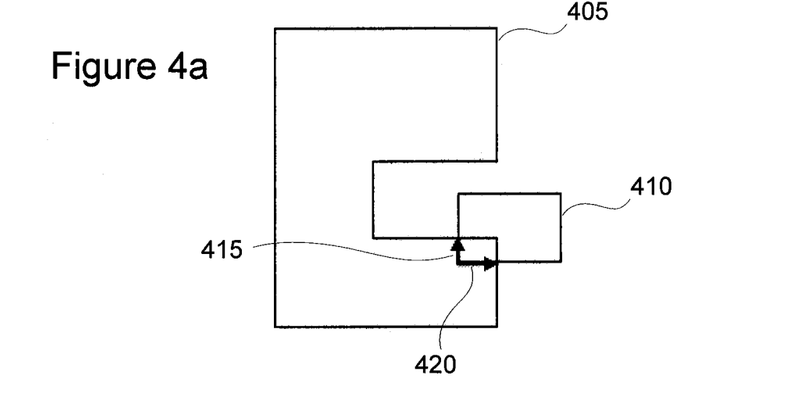
Figure 4B:
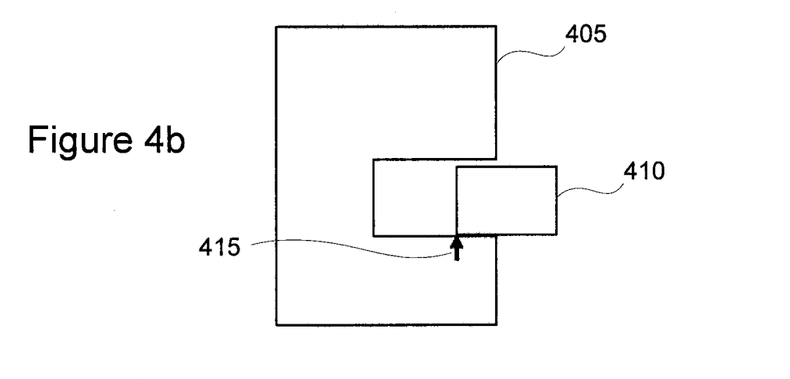
Figure 4C:
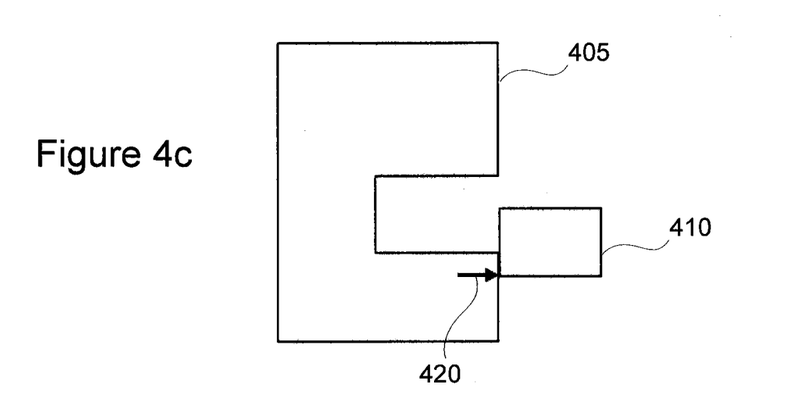
Figure 5A:
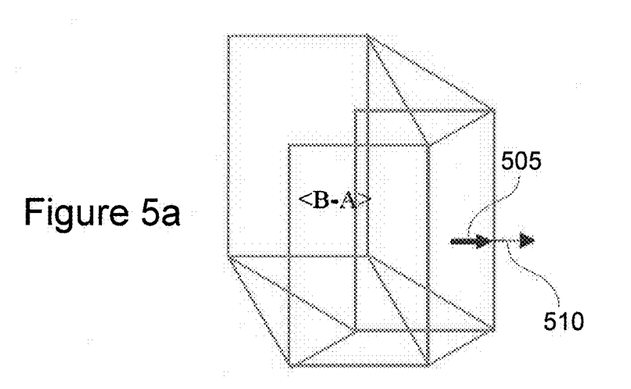
FIG. 5a depicts an actual and rough MTV.

As described in more detail below, finding a safe MTV is much faster than finding the optimal MTV. FIGS. 4a-4c illustrate the difference between optimal and safe MTV, using objects 405 and 410. FIG. 5a shows two colliding objects 405 and 410 and the arrows 415 and 420 represent two candidate MTV to move the small object to clear collision. The up arrow 415 is the optimal MTV because it's the shortest (shorter than candidate 420).

However, as shown in FIG. 4*b*, the optimal MTV 415 moves the object to a tight spot, where object 410 is surrounded on three sides by object 405, and very close to object 505 in two directions.

The other choice of right arrow 420 moves the object to an open space. This "safe" MTV is not as short as the optimal one, but it is the smallest one that not only clears the collision but also moves the object to a safe and open space, as illustrated in FIG. 4*c*.

As discussed above, the common usage of MTV in computer-aided manufacturing is for the collision avoidance of manufacturing equipment like robots and machine tools. To clear or avoid a collision, it's safer and desirable to move a robot arm or cutting tool to an open area. Hence, the goal is to ignore all tight spots and only compute the smallest MTV that moves the object to a safe and open area.

In various embodiments, the system uses bounding boxes to locate the safe MTV. To find the safe MTV, the CAD system can utilize the bounding boxes in the hierarchy structure. Preferably, the system traverses only to a shallow level, such as three levels deep in the octree hierarchy structure and uses the bounding boxes of the level three (or other selected shallow level) nodes to compute the MTV.

One reason to stop at level three nodes is based on performance consideration when using octrees. The empirical results show that traversing beyond level 3 takes considerable computation time while level two bounding boxes tend to be too coarse. The choice of depth depends on the width of the tree. For example, the corresponding choice for binary trees is level 9, which corresponds to level 3 of octrees.

The bounding box of a branch node is a convex hull of the actual descendent shapes so it provides a natural way to "fill up" the depression of the shape. It automatically eliminates all unsafe tight spaces so the resulting MTV always leads to a safe open space.

Since the bounding box is always larger than the actual shape, the computed MTV from bounding boxes is an estimated MTV that is always larger than the actual, optimal MTV. It represents the rough (approximated) location of the actual MTV. The method to pinpoint the actual MTV from the rough MTV is described in more detail below.

In some embodiments, the CAD system uses clipping to improve and finalize the MTV. The rough MTV location determined by the bounding-box process is in the rough location of the actual MTV, so system does not need to search far. To make it fast, the process only considers a cube of clipped "window" of space and uses a very aggressive culling. The system traverses deeper into the hierarchy structure but skips every pair of nodes when the Minkowski Difference of their bounding boxes doesn't intersect the clipped window.

Figure 5B:
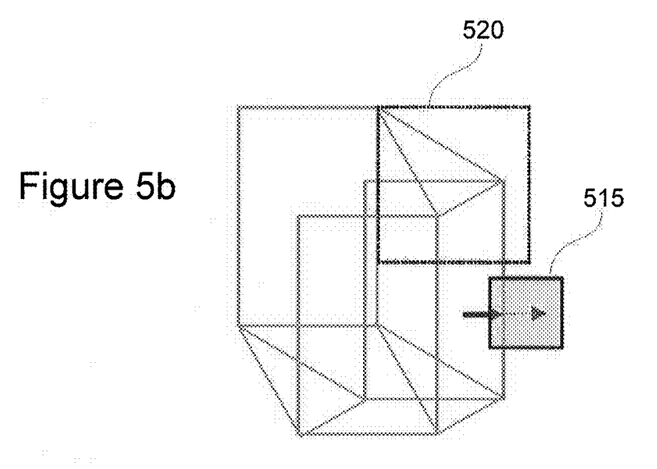
FIG. 5b depicts a clipped window, in accordance with disclosed embodiments.

FIG. 5*a* shows a simple example of the total Minkowski Difference $\langle B-A \rangle$, similar to that shown in FIG. 2B. The solid arrow 505 is the actual MTV while the dashed arrow 510 is the rough MTV. FIG. 5*b* shows the same example, with the additional shaded square 515 showing the clipped window. The dashed box represents 520 a possible pair wise Minkowski Difference (from the bounding box of a pair of nodes). The system can quickly determine that this Minkowski Difference is apart from the shaded window so it will never contribute to the actual MTV. The system then skips this pair of nodes and their descendents.

The system then only traverses to the nodes that can produce Minkowski Differences that can occupy a portion of the clipped window so only a small number of Minkowski Differences are used.

In some embodiments, the system can use a "greedy approach that consists of three stages in the MTD computation to improve the performance. These three stages are referred to herein as Estimate, Improve, and Finalize, and exemplary processes are illustrated in the flowcharts.

In the Estimate stage, the goal is to find the general location of the MTD vector. In this stage, the system goes three levels deep in each of the two bounding volume trees and uses the bounding volumes to compute the Minkowski Differences and the corresponding Voxel Model $Z^+$, as described above. The resulting Voxel Model is an approximation of and always larger than the actual model. The system uses $Z^+$ to compute the estimated $MTD^+$ and the corresponding MTD vector. The system repeats this process three times, from depth one to three. The result MTD+ from the shallow depth is used to trim the branches in the deeper depth. The coverage of the Voxel Model extends to the bounding boxes of the root nodes.

In the Improve stage, the goal is to gradually increase the accuracy of the MTD vector and reduce the range of search. The system selects a "cropped range", analogous to the range finder of the camera, centered at the estimated MTD vector (obtained in previous step) for the Voxel Model to reduce the search. With the cropped range, the system uses the bounding boxes from tree depth 4 to find the more accurate approximation of the MTD vector. The system repeats this process with a smaller cropped range of the Voxel Model and traverses to tree depth 5 to find a finer and more accurate result of MTD. The result is still an approximation, but is very close to the actual answer. The process can be repeated until depth 10, or other selected deep level.

In the Estimate and Improve stages, the system uses only the Minkowski Differences of bounding boxes. This has significant performance advantage because the Minkowski Difference of two boxes is also a box. The maximum point of the Minkowski Difference box is the displacement vector from the minimum point of the first box to the maximum point of the second box, whereas the minimum point of the Minkowski Difference box is the displacement vector from the maximum point of the first box to the minimum point of the second box. The source code inside TCDMinkowskiSum-.cpp is modified such that this simplified computation is used when the input pair is bounding boxes.

In the Finalize stage, the goal is to compute the exact solution. The system constructs a very fine Voxel Model surrounding the estimated MTD vector from the ZOOM_IN stage and traverses the bounding volume trees all the way to the leaf level to build the exact model Z and compute the exact MTD. To make the algorithm efficient, the system uses bounding boxes to prune the search. Before traversing deeper below any given pair of TCD nodes, the system computes the Minkowski Difference of the pair of bounding boxes. If the bounding box Minkowski Difference doesn't intersect with any portion of the coverage of the fine Voxel Model, we won't traverse any deeper.

The last stage of Finalize is mainly using the facets at the leaf level and is slower. However, the results from the first two stages are able to focus the search around the neighborhood of the estimated MTD vector so only small portion of the tree is being traversed. Most of the tree branches are not in the neighborhood and excluded from the traverse In some embodiments, the system uses a voxel model in clipping to get quick results. Once a clipped window is chosen, the system can use a voxel model to quickly locate the actual MTV.

The clipped window is basically a cube. In the voxel model, the system can divide the cube into small cubes with equal size and each voxel (small cube) is labeled by a triplet of integers.

The voxel model as disclosed herein is to divide the 3-D space into small rectangular boxes (with same size), which are called voxels, and label each one by a set of integers (i,j,k). Every voxel is initialized as "empty" to indicate the vacuum state. To record the volume of a given Minkowski Difference, the system marks the voxels that are contained by the Minkowski Difference as "occupied" and leaves the outside voxels as empty. In addition, the system marks those voxels that are on the boundary between occupied (inside) and empty (outside) voxels as "transition".

The CAD solution is concerned with the "visible" sides of the Minkowski Difference so the system, in this embodiment, only marks the visible transition voxels. The visible sides are those sides that are visible to the conceptual lights that are directed from infinity toward the origin, opposite to conceptual lights coming out from the light source at origin. The system can also store the pointer to the Minkowski Difference in all corresponding visible transition voxels.

Recall that one step of computing MTD is to compute the union of all Minkowski Differences. In these embodiments, the system surveys every Minkowski Difference against the Voxel Model and marks every voxel that is contained by any Minkowski Difference as occupied, and the ones at the visible sides as visible transition.

When an empty or visible transition voxel is occupied by another Minkowski Difference, it is marked as occupied. If a visible transition voxel is also the visible transition of another Minkowski Difference, the pointer to this Minkowski Difference is also stored within the voxel. At the end, the union of all occupied voxels forms the approximate shape of the union of all Minkowski Differences.

To find the MTD, the system searches for the visible transition voxel that is closest to the origin and this voxel location is the approximate location of the MTD vector. The accuracy of Voxel Model is determined by the size of the voxels.

To improve the accuracy without sacrificing the speed, the system can use a "recursive voxel model". That is, the system can start with a rough voxel model to find the general location of MTD, then subdivide the rough voxel into many fine voxels with smaller size and repeat the marking on these finer voxels, and repeat the whole process recursively only the desired accuracy is achieved. Finally, at the candidate MTD voxel, the system can pinpoint to all nearby Minkowski Differences (which were stored within the voxel) to compute the exact value of MTD.

Figure 6:
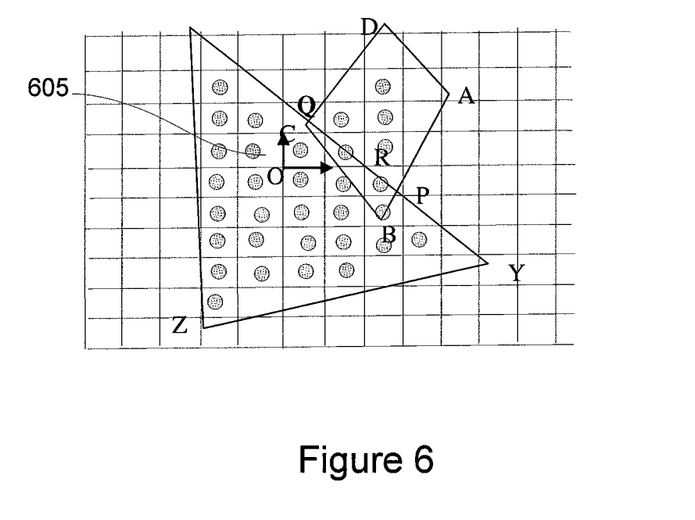
FIG. 6 illustrates two Minkowski Differences and a corresponding Voxel Model in accordance with disclosed embodiments.

FIG. 6 illustrates two Minkowski Differences and the corresponding Voxel Model. The occupied voxels are marked by circles. The voxels that surround the occupied voxels are transition voxels. The transition voxel near point Q is the one that contains the MTD vector, while point O is the origin. Origin O shows candidate MTDs 605 extending from it.

In some embodiments, the system uses successive clipping to ensure correctness. As described above, it can be desirable to choose a small clipping in order to skip a large portion of tree nodes that do not occupy the clipped window for a better performance. However, choosing a clipped window that is too small may miss the actual MTV. If the clipped window doesn't cover the actual MTV, all voxels remain "empty" and nothing is found.

Figure 7:
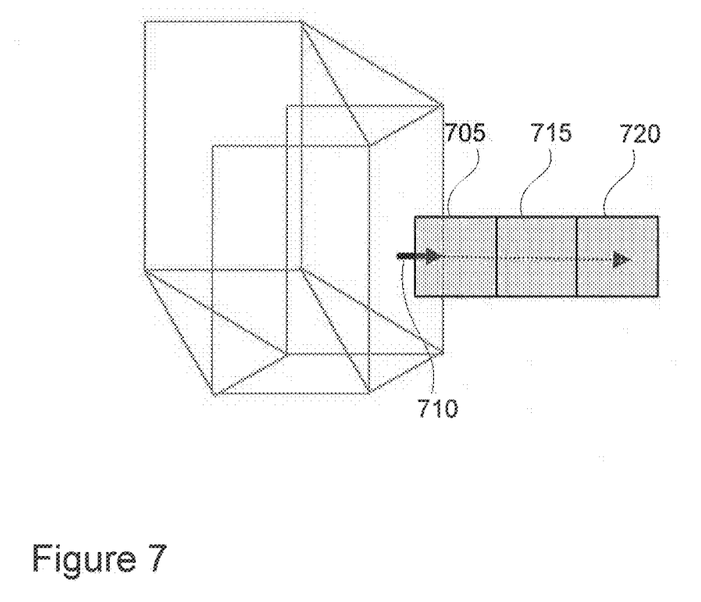
FIG. 7 illustrates exemplary movement of a clipping window during the successive clipping process.

Note that if a clipped window is empty, there is always an answer that is closer to the origin. Therefore, the system can move the clipped window closer to the origin repeatedly until the MTV is found. FIG. 7 illustrates exemplary movement of a clipping window. In FIG. 7, the first clipped window 705 is shown (shaded square) at the rightmost missed the actual MTV (bold Arrow 710). The subsequent clipped windows 715 and 720 are chosen closer to the origin until the third one finds the MTV. This method ensures that the actual safe MTV is found.

Figure 8:
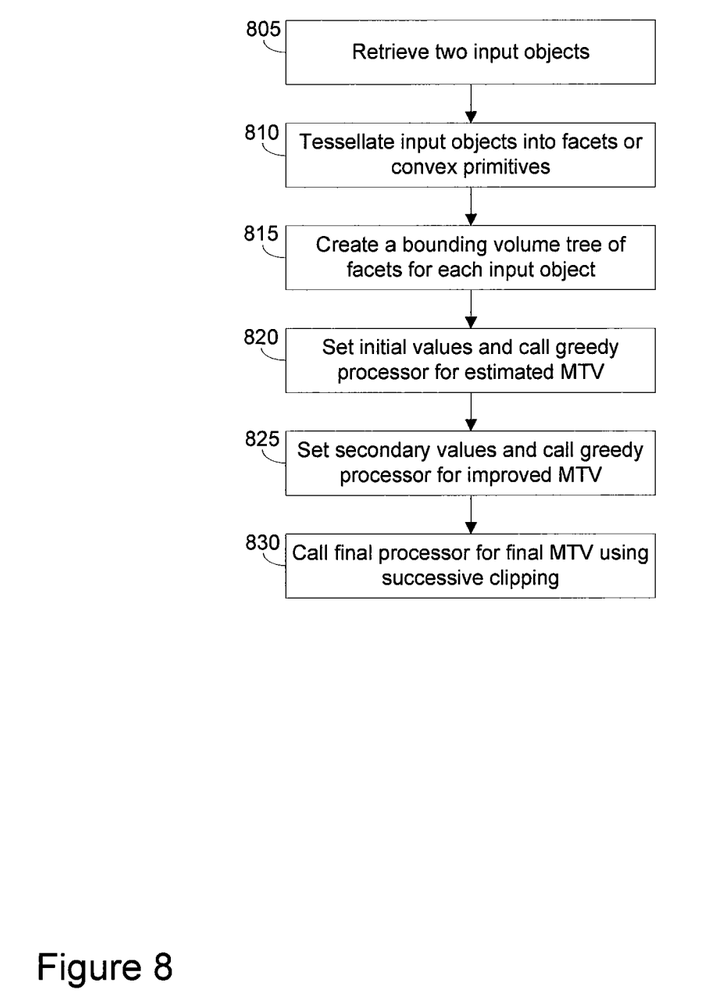
FIGS. 8-11 depict processes in accordance with disclosed embodiments.

FIG. 8 depicts a master process in accordance with disclosed embodiments. The computation of MTV, in some embodiments, includes the following steps:

The CAD system retrieves two input objects A and B (step 805). This process can include loading them from a computer-readable storage, receiving them over a network, or other means known to those of skill in the art. The objects can be two-dimensional or three-dimensional object models.

The system tessellates the input objects A and B into facets (triangles) or convex primitives of $A_i$ and $B_j$ (step 810). The system can, but will not necessarily, record the connectivity information among the facets. The system creates a bounding volume tree of facets or convex primitives for each of the input objects A and B (step 815).

Figure 9:
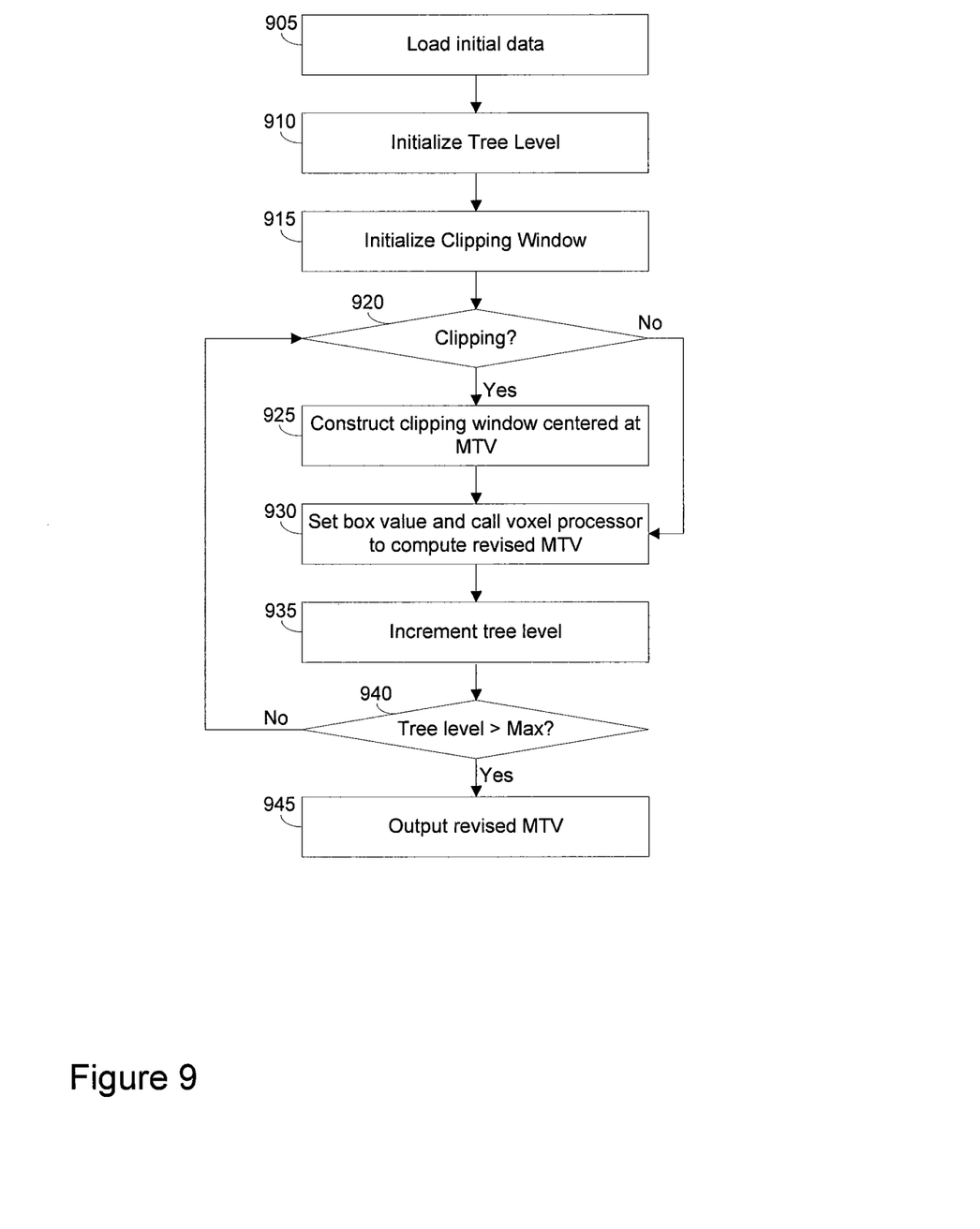

Next, the system sets the initial values, which in some embodiments includes setting the minimum level to 1, the maximum level to a shallow level such as 3, clipping to false, and the system calls the greedy processor process, as illustrated in FIG. 9 (step 820). This step corresponds to the Estimate stage explained previously.

The system receives the result of the greedy processor process, sets secondary values which in some embodiments includes setting the minimum level to 4, the maximum level to a deep level such as 10, clipping to true, and the system again calls the greedy processor process, as illustrated in FIG. 9 (step 825). This step corresponds to the Improve stage explained previously.

Figure 11:
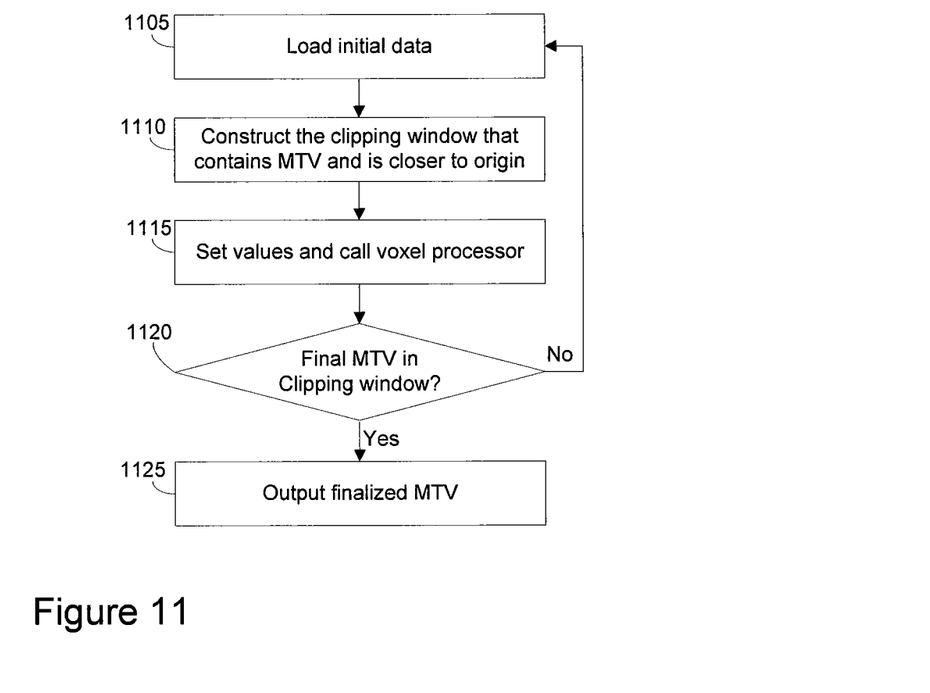

The system receives the result of the second greedy processor process, and calls the final processor process, as illustrated in FIG. 11, to finalize the MTV using successive clipping (step 830). This step corresponds to the Finalize stage explained previously. The finalized MTV is returned from this process, and is stored in the CAD system or other computer readable medium, and is optionally displayed to a user.

FIG. 9 illustrates a greedy processor process in accordance with disclosed embodiments. In this process, the system first loads initial data (which can include being passed data from the calling process), including the minimum level, maximum level, clipping value, the bounding volume trees, and the current MTV (step 905).

The system initializes the tree level by setting it to the minimum level (step 910).

The system initializes the clipping window to the box that contains all (step 915).

The system checks if clipping is true (step 920). If so, the system constructs a clipping window centered at the MTV (step 925), and if not, skips step 925.

Figure 10:
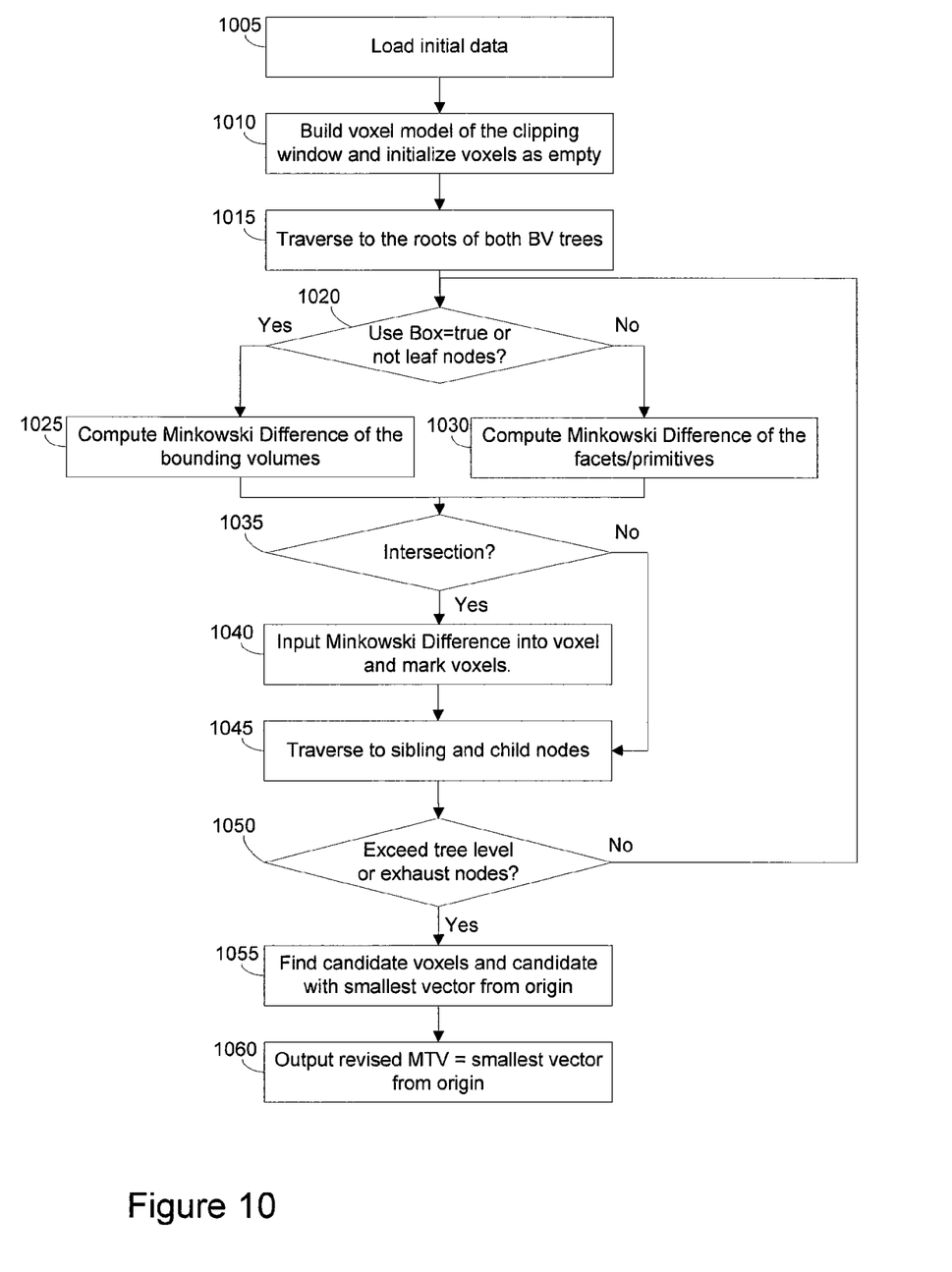

The system sets the "Use Box" value to true and calls the voxel processor, as illustrated in FIG. 10, to compute the revised MTV (step 930).

The system receives the results of the voxel processor and increments the tree level (step 935). If the tree level has not exceeded the maximum tree level (step 940), the process repeats to step 920. Else, the system outputs the revised MTV to the calling process (step 945).

FIG. 10 illustrates a voxel processor that computes the union of all Minkowski Differences $$\bigcup_{i,j} C_{j,i}$$

in accordance with a disclosed embodiment. Here, the system traverses the trees and computes the pair-wise Minkowski Differences and builds a voxel model Z that represents the union, as described in more detail below.

In this process, the system first loads initial data (which can include being passed the data from the calling process), including the tree level, the Use Box value, the clipping window, the bounding volume trees, and the current MTV (step 1005).

The system builds a voxel model of the clipping window and initializes the voxels as empty (step 1010).

They system traverses to the roots of both BV trees (step 1015).

The step determines if the Use Box value is true or if there are not leaf nodes (step 1020). If either of these is the case, the system computes the Minkowski Difference of the bounding volumes (step 1025). If neither is the case, the system computes the Minkowski Difference of the facets/primitives (step 1030).

The system determines if there is an intersection between the computed Minkowski Difference and the current clipping window (step 1035). If there is not, step 1040 is skipped.

If so, the system inputs the computed Minkowski Difference into the voxel model and marks the voxels accordingly (step 1040). In the Voxel Model, each voxel $V_{\alpha\beta\gamma}$ is marked as either OUTSIDE (empty), INSIDE (occupied), or VISIBLE (transition). The MTD pointers of all of $C_{ji}$ that are near a given VISIBLE voxel are stored within the voxel. For each Minkowski Difference in the voxel model Z, the system performs the marks the voxel as follows:

The system marks every voxel that is fully occupied by the Minkowski Difference as "occupied", no matter what the state of the voxel was. An "occupied" voxel stays "occupied" forever. The system marks any voxels that are on the boundary between "occupied" and "empty" as "transitional" if the voxel state was not "occupied". The reference of this Minkowski Difference is added to the associated memory of the "transitional" voxels.

Next, the system traverses to the sibling or child nodes (step 1045).

The system determines if the process has exceeded the tree level or exhausted all the child nodes (step 1050). If not, the process repeats to step 1020.

If so, the system finds the candidate voxels and determines the one with the smallest vector from the origin (step 1055). The system outputs smallest vector from origin as the revised MTV (step 1060). The vector between the origin and this voxel of the voxel model Z corresponds to the MTD between objects A and B, as $\|MTD(O,Z)\|=\|MTD(A,B)\|$.

FIG. 11 depicts a final processor process in accordance with disclosed embodiments, also referred to as a successive clipping process. In this process, the system first loads initial data (which can include being passed the data from the calling process), including the bounding volume trees and the current MTV (step 1105).

The system constructs the clipping window that contains the MTV and is closer to the origin (step 1110).

The system sets initial values, including in some embodiments setting the Use Box value to false and the tree level to infinite, and calls the voxel processor process as illustrated in FIG. 10 to compute the final MTV (step 1115).

The system determines if the final MTV is in the clipping window (step 1120). If not, the process repeats to step 1110. Otherwise, the system outputs the finalized MTV from the process (step 1125).

In some embodiments, a surface shell is used based on the hollow shell of the surfaces instead of the volume enclosed by the shell. In some embodiments, the processes disclosed herein can report and/or store the global minimal translation vector that represents the shortest vector to move the first part to clear the collision with the second part. In some embodiments, the location of penetration or the starting position of the minimal translation vector is on the shell of the first part and near the general vicinity of the deepest penetration. The location may not be exact because it may not be unique or well-defined. In some embodiments, the precision can be determined automatically based on the density of the tessellation of the parts.

Techniques known to those of skill in the art that can be utilized by disclosed embodiments include E. G. Gilbert, D. W. Johnson, and S. S. Keerthi, "A fast procedure for computing the distance between complex objects in three-dimensional space", IEEE J. Robotics and Automation, volume 4 (1988), #2; S. Cameron, "Enhancing GJK: Computing Minimum and Penetration Distances between Convex Polyhedra", IEEE Int. Conf. Robotics & Automation, Albuquerque, 22-24 Apr. 1997; S. A. Ehmann and M. C. Lin, "Accurate and Fast Proximity Queries between Polyhedra Using Convex Surface Decomposition", Eurographics, volume 20 (2001), #3; and Y. J. Kim, M. A. Otuduy, M. C. Lin, and D. Manocha, "Fast Penetration Depth Computation for Physically-based Animation", ACM Symposium on Computer Animation, 21-22 Jul. 2002, all of which are hereby incorporated by reference.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of a instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method for determining a minimal translation vector (MTV) between a first object and a second object represented in a CAD system, comprising the steps of:
    retrieving, in the CAD system, the first object and the second object;
    tessellating the first object and second object, by the CAD system, into respective facets;
    creating a bounding volume tree of facets, by the CAD system, for each of the first object and the second object;
    performing a greedy process on the bounding volume trees, by the CAD system, to produce a initial MTV; and
    performing a successive clipping process according to the bounding volume trees and the initial MTV, by the CAD system, to produce a final MTV, wherein the successive clipping process does not process at least a portion of the bounding volume tree based on facets that are outside of a clipping window;
    storing the final MTV in a computer readable medium.

2. The method of claim 1, wherein the greedy process is performed a first time, using a bounding box approximation up to tree level 3, to determine an estimated MTV, and is performed a second time, using a bounding box approximation and clipping window technique up to tree level 10, to determine an improved MTV that is output as the initial MTV.

3. The method of claim 1, wherein the greedy process includes the steps of:
    loading initial data;
    initializing a tree level and the clipping window;
    while the tree level is less than or equal to a maximum tree level, then performing a voxel process using the tree level and the clipping window to determine a revised MTV; and
    storing the revised MTV and outputting the revised MTV.

4. The method of claim 3, wherein the initial data includes one or more of a minimum level, the maximum level, a clipping value, the bounding volume trees, and a current MTV.

5. The method of claim 3, wherein the voxel process includes the steps of:
    loading voxel initial data;
    building a voxel model of the clipping window;
    computing the Minkowski Difference between the bounding volume trees;
    if there is an intersection between the clipping window and the Minkowski Difference, then marking each voxel in the voxel model;
    determining at least one candidate voxel from the marked voxels and determining a candidate voxel with a smallest vector from an origin;
    outputting the smallest vector from the origin as the revised MTV.

6. The method of claim 5, wherein the voxel initial data includes one or more of a tree level, a Use Box value, the clipping window, the bounding volume trees, and the current MTV.

7. The method of claim 1, wherein the successive clipping process includes the steps of:
    loading clipping process initial data;
    constructing the clipping window so that it contains a current MTV and is closer to an origin than a previous clipping window;
    performing a voxel process using the tree level and the clipping window to determine a revised MTV;
    if the revised MTV is not within the clipping window, then repeating to the constructing step; and
    storing the revised MTV and outputting the revised MTV as a final MTV.

8. A CAD system comprising: a processor and accessible memory, the CAD system particularly configured to perform a process for determining a minimal translation vector (MTV) between a first object and a second object represented in a CAD system, including the steps of:
    retrieving the first object and the second object;
    tessellating the first object and second object into respective facets;
    creating a bounding volume tree of facets for each of the first object and the second object;
    performing a greedy process on the bounding volume trees to produce a initial MTV; and
    performing a successive clipping process according to the bounding volume trees and the initial MTV to produce a final MTV, wherein the successive clipping process does not process at least a portion of the bounding volume tree based on facets that are outside of a clipping window;
    storing the final MTV in a computer readable medium.

9. The CAD system of claim 8, wherein CAD systems performs the greedy process a first time, using a bounding box approximation up to tree level 3, to determine an estimated MTV, and a second time, using a bounding box approximation and clipping window technique up to tree level 10, to determine an improved MTV that is output as the initial MTV.

10. The CAD system of claim 8, wherein the greedy process performed by the CAD system includes the steps of:
    loading initial data;
    initializing a tree level and the clipping window;
    while the tree level is less than or equal to a maximum tree level, then performing a voxel process using the tree level and the clipping window to determine a revised MTV; and
    storing the revised MTV and outputting the revised MTV.

11. The CAD system of claim 10, wherein the initial data includes one or more of a minimum level, the maximum level, a clipping value, the bounding volume trees, and a current MTV.

12. The CAD system of claim 10, wherein the voxel process performed by the CAD system includes the steps of:
    loading voxel initial data;
    building a voxel model of the clipping window;
    computing the Minkowski Difference between the bounding volume trees;
    if there is an intersection between the clipping window and the Minkowski Difference, then marking each voxel in the voxel model;
    determining at least one candidate voxel from the marked voxels and determining a candidate voxel with a smallest vector from an origin;
    outputting the smallest vector from the origin as the revised MTV.

13. The CAD system of claim 12, wherein the voxel initial data includes one or more of a tree level, a Use Box value, the clipping window, the bounding volume trees, and the current MTV.

14. The CAD system of claim 8, wherein the successive clipping process performed by the CAD system includes the steps of:
    loading clipping process initial data;

constructing the clipping window that contains a current MTV and is closer to an origin than a previous clipping window;

performing a voxel process using the tree level and the clipping window to determine a revised MTV;

if the revised MTV is not within the clipping window, then repeating to the constructing step; and storing the revised MTV and outputting the revised MTV as a final MTV.

15. A non-transitory computer readable medium encoded with computer method instructions that, when executed, cause a CAD system to perform a process for determining a minimal translation vector (MTV) between a first object and a second object represented in the CAD system, including the steps of:

retrieving the first object and the second object;

tessellating the first object and second object into respective facets;

creating a bounding volume tree of facets for each of the first object and the second object;

performing a greedy process on the bounding volume trees to produce a initial MTV; and performing a successive clipping process according to the bounding volume trees and the initial MTV to produce a final MTV, wherein the successive clipping process does not process at least a portion of the bounding volume tree based on facets that are outside of a clipping window;

storing the final MTV in a computer readable medium.

16. The computer readable medium of claim 15, wherein the greedy process is performed a first time, using a bounding box approximation up to tree level 3, to determine an estimated MTV, and is performed a second time, using a bounding box approximation and clipping window technique up to tree level 10, to determine an improved MTV that is output as the initial MTV.

17. The computer readable medium of claim 15, wherein the greedy process includes the steps of:

loading initial data;

initializing a tree level and the clipping window;

while the tree level is less than or equal to a maximum tree level, then performing a voxel process using the tree level and the clipping window to determine a revised MTV; and storing the revised MTV and outputting the revised MTV.

18. The computer readable medium of claim 17, wherein the initial data includes one or more of a minimum level, the maximum level, a clipping value, the bounding volume trees, and a current MTV.

19. The computer readable medium of claim 17, wherein the voxel process includes the steps of:

loading voxel initial data;

building a voxel model of the clipping window;

computing the Minkowski Difference between the bounding volume trees;

if there is an intersection between the clipping window and the Minkowski Difference, then marking each voxel in the voxel model;

determining at least one candidate voxel from the marked voxels and determining a candidate voxel with a smallest vector from an origin;

outputting the smallest vector from the origin as the revised MTV.

20. The computer readable medium of claim 19, wherein the voxel initial data includes one or more of a tree level, a Use Box value, the clipping window, the bounding volume trees, and the current MTV.

21. The computer readable medium of claim 15, wherein the successive clipping process includes the steps of:

loading clipping process initial data;

constructing the clipping window so that it contains a current MTV and is closer to an origin than a previous clipping window;

performing a voxel process using the tree level and the clipping window to determine a revised MTV;

if the revised MTV is not within the clipping window, then repeating to the constructing step; and storing the revised MTV and outputting the revised MTV as a final MTV.

* * * * *